United States Patent
Sugimoto (10) Patent No.: US 10,852,802 B2
(45) Date of Patent: Dec. 1, 2020

(54) SEMICONDUCTOR DEVICE INCLUDING FAULT DETECTOR, AND DISPLAY DEVICE

(71) Applicant: Rohm Co., Ltd., Kyoto (JP)

(72) Inventor: Yasuhito Sugimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 98 days.

(21) Appl. No.: 16/096,749

(22) PCT Filed: May 8, 2017

(86) PCT No.: PCT/JP2017/017379
§ 371 (c)(1),
(2) Date: Oct. 26, 2018

(87) PCT Pub. No.: WO2011/195727
PCT Pub. Date: Nov. 16, 2017

(65) Prior Publication Data
US 2019/0121412 A1    Apr. 25, 2019

(30) Foreign Application Priority Data
May 10, 2016    (JP) .................................. 2016-094821

(51) Int. Cl.
*G06F 1/28* (2006.01)
*G09G 3/36* (2006.01)
(Continued)

(52) U.S. Cl.
CPC ................. *G06F 1/28* (2013.01); *G05F 1/10* (2013.01); *G06F 1/26* (2013.01); *G09G 3/006* (2013.01);
(Continued)

(58) Field of Classification Search
CPC combination set(s) only.
See application file for complete search history.

(56) References Cited

U.S. PATENT DOCUMENTS 8,214,670 B2 *  7/2012  Ishikura ................ G06F 1/3203
                                                           713/310
8,255,728 B2 *  8/2012  Liao ........................ G06F 1/263
                                                           713/300

(Continued)

FOREIGN PATENT DOCUMENTS

JP    2007-114476 A    5/2007
JP    2010-252444 A    11/2010

(Continued)

OTHER PUBLICATIONS

Japan Patent Office, International Search Report for PCT/JP/017379 dated Jun. 6, 2017 with English translation.

*Primary Examiner* — Raymond N Phan
(74) *Attorney, Agent, or Firm* — Fish & Richardson P.C.

(57) ABSTRACT

A semiconductor device equipped with: a power supply circuit that contains multiple power supply blocks mutually having input/output relationships; a power supply control unit that outputs control signals to each of the power supply blocks indicating On/Off; a fault detection unit; and a sequencer. When the fault detection unit detects that any of the control signals indicates Off during startup of the power supply circuit, the sequencer moves to a prescribed shutdown sequence mode, and the power supply control unit performs a shutdown sequence in which the control signals are output so as to turn off the power supply blocks in a prescribed order.

7 Claims, 8 Drawing Sheets

(51) Int. Cl.
*H02M 3/00* (2006.01)
*G06F 1/26* (2006.01)
*G09G 3/20* (2006.01)
*G05F 1/10* (2006.01)
*G09G 3/00* (2006.01)
*G09G 3/32* (2016.01)
*H02M 3/157* (2006.01)

(52) U.S. Cl.
CPC ................. *G09G 3/20* (2013.01); *G09G 3/32* (2013.01); *G09G 3/36* (2013.01); *H02M 3/00* (2013.01); *H02M 3/157* (2013.01)

(56) References Cited

U.S. PATENT DOCUMENTS

| | | | |
|---|---|---|---|
| 9,431,826 B2* | 8/2016 | Matsui | H02J 3/00 |
| 9,806,623 B2* | 10/2017 | Grosso | H02M 3/33561 |
| 2007/0091033 A1 | 4/2007 | Nakamura | |
| 2016/0098072 A1* | 4/2016 | Shih | G06F 1/3209 |
| | | | 713/310 |
| 2017/0075369 A1* | 3/2017 | Umezawa | G05F 1/462 |

FOREIGN PATENT DOCUMENTS

| | | |
|---|---|---|
| JP | 2011-019349 A | 1/2011 |
| JP | 2012-115114 A | 6/2012 |

\* cited by examiner

SEMICONDUCTOR DEVICE INCLUDING FAULT DETECTOR, AND DISPLAY DEVICE

TECHNICAL FIELD

The present invention relates to semiconductor devices including a power circuit.

BACKGROUND ART

In some conventional power circuits, a power block included in them is controlled according to an enable signal fed from outside the power circuits.

Conventionally, if, during the operation of the power block, the enable signal happens to come to indicate off due to noise or the like, the fault is detected by detecting abnormal behavior of the output voltage, output current, or the like that results from the power block turning off.

LIST OF CITATIONS

Patent Literature

Patent Document 1: JP-2007-114476-A

SUMMARY OF THE INVENTION

Technical Problem

Inconveniently, with the fault detection method mentioned above, there is a delay until the output voltage or the like becomes abnormal; thus, it takes time to detect a fault.

Moreover, in a case where a power circuit includes a plurality of power blocks and their inputs and outputs are interrelated with each other, care needs to be taken not to cause malfunction when turning off the power circuit on detecting a fault.

In particular, in the case of power circuits for vehicle-mounted use, there is high demand for their safety to comply with an internationally formulated standard for functional safety of electrical and/or electronic systems in production automobiles, such as ISO 26262.

Against the background presented above, an object of the present invention is to provide a semiconductor device that can detect a fault in a power circuit promptly and that can turn off the power circuit safely.

Means for Solving the Problem

According to one aspect of the present invention, a semiconductor device includes:
 a power circuit including a plurality of power blocks having an input-output interrelationship with each other;
 a power controller outputting control signals indicating on or off to the plurality of power blocks respectively;
 a fault detector; and
 a sequencer.

Here, when, during the startup of the power circuit, the fault detector detects at least one of the control signals indicating off, the sequencer shifts to a predetermined shutdown sequence state and the power controller outputs the control signals so as to turn off the power blocks in a predetermined order (a first configuration).

In the first configuration described above, preferably, after the shutdown sequence, the sequencer shifts to a startup sequence state and the power controller outputs the control signals so as to turn on the power blocks in a predetermined order (a second configuration).

In the first or second configuration described above, preferably, the fault detector includes an AND circuit to which the control signals are input (a third configuration).

In the third configuration described above, preferably, the fault detector further includes a digital filter provided in the stage succeeding the AND circuit (a fourth configuration).

In the third or fourth configuration described above, preferably, the power controller can output a power startup flag indicating a startup state of the power circuit to a host controller, and the power startup flag is also input to the AND circuit (a fifth configuration).

In any one of the first to fifth configurations described above, preferably, there is further provided a driver driving a display panel, and the output voltages of the power blocks are fed to the driver (a sixth configuration).

In the sixth configuration described above, preferably, the fault detector includes an AND circuit to which the control signals are input, and control signals that are output to the driver are also input to the AND circuit (a seventh configuration).

In the sixth or seventh configuration described above, preferably, the sequencer in a state where the display panel is in a display-off state shifts to the shutdown sequence based on a sleep-in command, and when a fault is detected by the fault detector, regardless of the sleep-in command, the sequencer forcibly shifts to the shutdown sequence (an eighth configuration).

In any one of the sixth to eighth configurations described above, preferably, the sequencer in a display-on state where video based on video data is displayed on the display panel by the driver shifts to the shutdown sequence based on an sleep-in command, and when a fault is detected by the fault detector, regardless of the sleep-in command, the sequencer forcibly shifts to the shutdown sequence (a ninth configuration).

According to another aspect of the present invention, a display device includes: a semiconductor device according to any one of the sixth to ninth configurations described above; and a display panel driven by the semiconductor device.

Advantageous Effects of the Invention

According to the present invention, it is possible to detect a fault in a power circuit promptly and to turn off the power circuit safely.

DESCRIPTION OF EMBODIMENTS

An embodiment of the present invention will be described below with reference to the accompanying drawings.

<Liquid Crystal Display Device>

Figure 1:
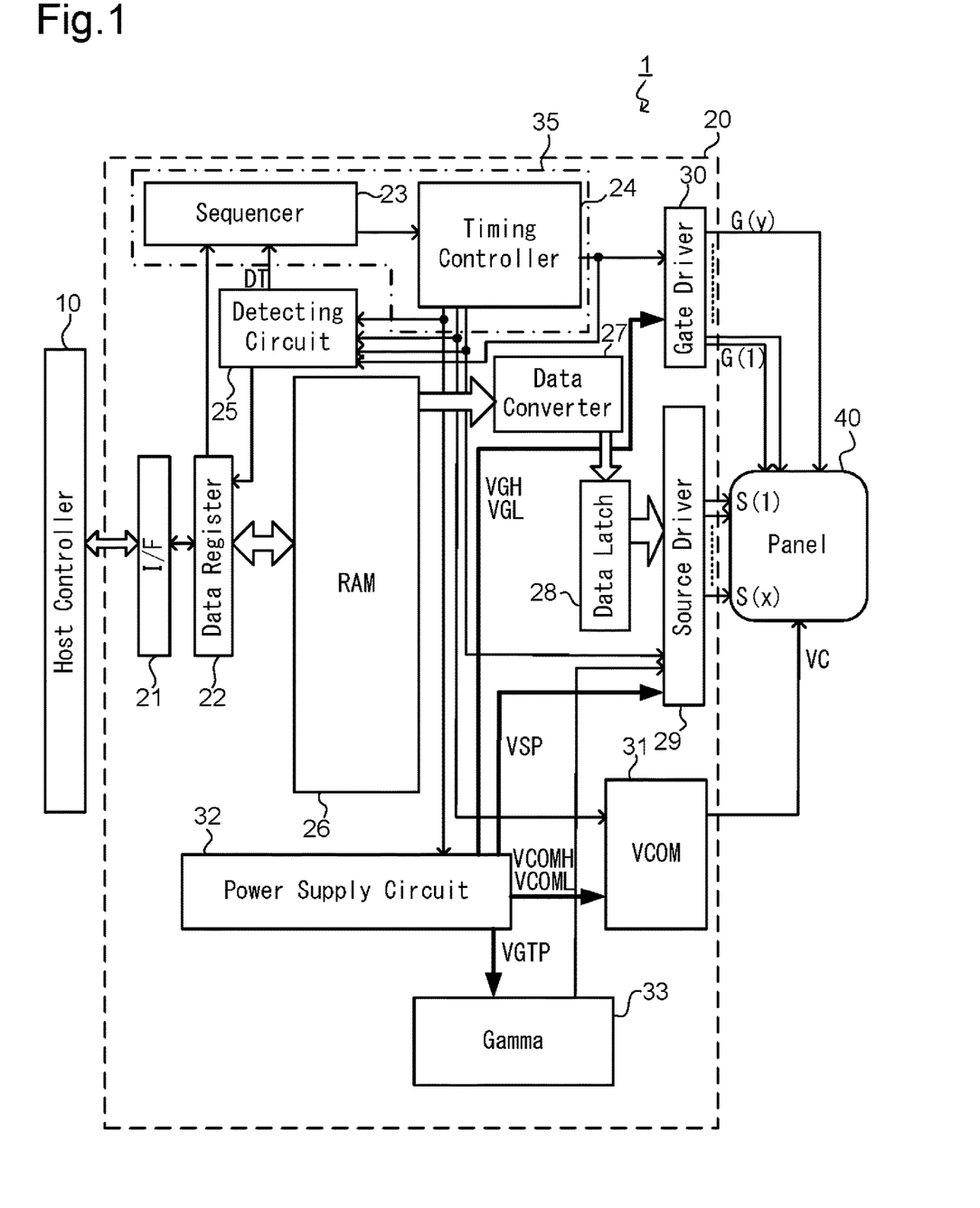
FIG. 1 is a block diagram showing a configuration of a liquid crystal display device according to one embodiment of the present invention.

FIG. 1 is a block diagram showing an example of the configuration of a liquid crystal display device. The liquid crystal display device 1 of this configuration example includes an LCD (liquid crystal display) driver 20 and an LCD panel 40. The LCD driver 20 drives and controls the LCD panel 40 based on video data and various commands fed from a host controller 10 (such as a microcomputer). The LCD panel 40 is a means of outputting video by using liquid crystal elements as pixels, and is driven as a load of the LCD driver 20.

<LCD Driver>

With reference still to FIG. 1, the LCD driver 20 will now be described in detail. The LCD driver 20 includes an interface 21, a data register 22, a sequencer 23, a timing controller 24 (power controller), a fault detection circuit 25, a RAM (random-access memory) 26, a data converter 27, a data latch 28, a source driver 29, a gate driver 30, a common voltage generator 31, a power supply circuit 32, and a gamma voltage generator 33. The LCD driver 20 is a semiconductor device (IC) having the just-enumerated elements integrated into a single chip. The source driver 29, the gate driver 30, and the common voltage generator 31 constitute a driver that drives the LCD panel 40.

The interface 21 exchanges data with the host controller 10, and receives video data, various commands, and the like from the host controller 10. The command register 22 stores video data and various commands fed from the host controller 10 via the interface 21.

The sequencer 23 changes states in accordance with the command stored in the data register 22. The timing controller 24 performs various kinds of timing control in the LCD driver 20 based on instructions from the sequencer 23. For example, the timing controller 24 performs vertical synchronization control for the gate driver 30 and the common voltage generator 31, horizontal synchronization control for the source driver 29, startup and shutdown control for the power supply circuit 32, and so forth.

The gate driver 30 operates by receiving a positive supply voltage VGH and a negative supply voltage VGL from the power supply circuit 32. Based on a vertical synchronizing signal fed from the timing controller 24, the gate driver 30 generates gate signals G(1) to G(y) for the LCD panel 40. In a case where the LCD panel 40 is of an active matrix type, the gate signals G(1) to G(y) are fed to the gate terminals of the active elements connected respectively to the liquid crystal elements of the LCD panel 40.

The RAM 26 is loaded with video data stored in the data register 22. The video data loaded in the RAM 26 is converted to data in a predetermined format by the data converter 27, and is then fed via the data latch 28 to the source driver 29.

The source driver 29 operates by receiving a supply voltage VSP from the power supply circuit 32. The source driver 29 coverts the video data fed to it into source signals S(1) to S(x). Based on a horizontal synchronizing signal fed from the timing controller 24, the source driver 29 feeds the source signals S(1) to S(x) to the LCD panel 40. In a case where the LCD panel 40 is of an active matrix type, the source signals S(1) to S(x) are fed to the source terminals of the active elements connected respectively to the liquid crystal elements of the LCD panel 40.

The common voltage generator 31 operates by receiving a positive supply voltage VCOMH and a negative supply voltage VCOML. The common voltage generator 31 generates a common voltage VC, and feeds it to a common electrode of the LCD panel 40 that is common to all the pixels constituting it.

The gamma voltage generator 33 operates by receiving a supply voltage VGTP from the power supply circuit 32. The gamma voltage generator 33 generates a gradation voltage for correcting luminance values in the video data received by the interface 21.

The fault detection circuit 25 monitors various enable signals fed from the timing controller 24 to detect a faulty state. The fault detection circuit 25 will be described in detail later.

<Configuration of Power Circuit>

Figure 2:
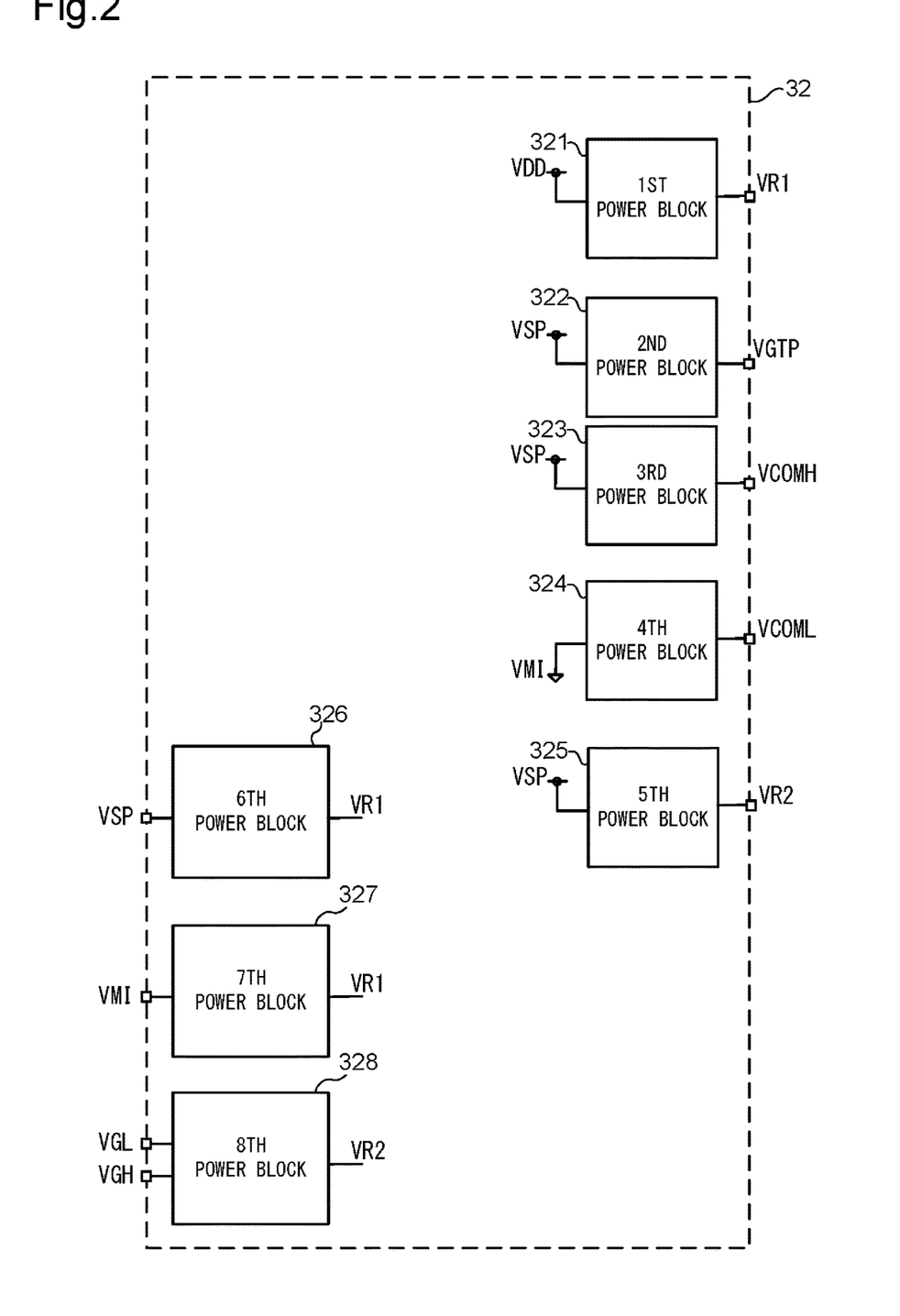
FIG. 2 is a diagram showing an outline of a configuration of a power circuit according to one embodiment of the present invention.

Next, the configuration of the power supply circuit 32 will be described. FIG. 2 is a diagram showing an outline of the configuration of the power supply circuit 32. The power supply circuit 32 includes a first power block 321, a second power block 322, a third power block 323, a fourth power block 324, a fifth power block 325, a sixth power block 326, a seventh power block 327, and an eighth power block 328. These power blocks are each composed of circuits such as an amplifier and a charge pump.

The first power block 321 generates and outputs, based on a predetermined supply voltage VDD, a voltage VR1.

The sixth power block 326 generates and outputs, based on the voltage VR1 fed to it, the supply voltage VSP. The supply voltage VSP is fed to the source driver 29.

The second power block 322 generates and outputs, based on the supply voltage VSP, the supply voltage VGTP. The supply voltage VGTP is fed to the gamma voltage generator 33.

The third power block 323 generates and outputs, based on the supply voltage VSP, the positive supply voltage VCOMH. The positive supply voltage VCOMH is fed to the common voltage generator 31.

The fifth power block 325 generates and outputs, based on the supply voltage VSP, a voltage VR2. The eighth power block 328 generates and outputs, based on the voltage VR2 fed to it, the negative and positive supply voltages VGL and VGH. The negative and positive supply voltages VGL and VGH are fed to the gate driver 30.

The seventh power block 327 generates and outputs, based on the voltage VR1 fed to it, a voltage VMI. The fourth power block 324 generates and outputs, based on the voltage VMI, the negative supply voltage VCOML. The negative supply voltage VCOML is fed to the common voltage generator 31.

Figure 3:
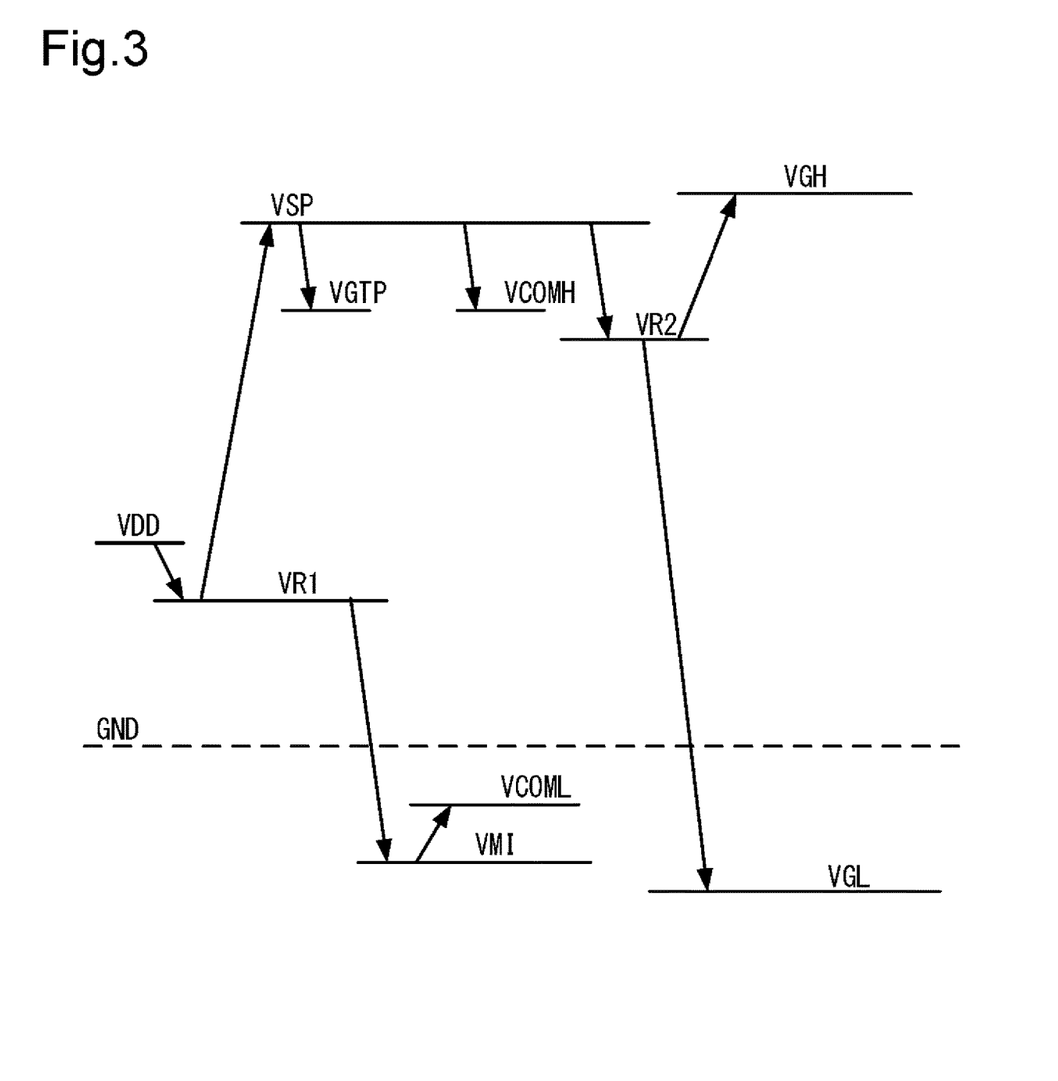
FIG. 3 is a diagram showing an input-output voltage interrelationship in a power circuit.

FIG. 3 is a diagram showing the input-output voltage interrelationship of the power blocks 321 to 328 with each other. With this interrelationship, if, when the power blocks 321 to 328 are all in the on state, any one turns off, a fault in the display operation of the LCD panel 40 results.

<State Transition Control>

Figure 4:
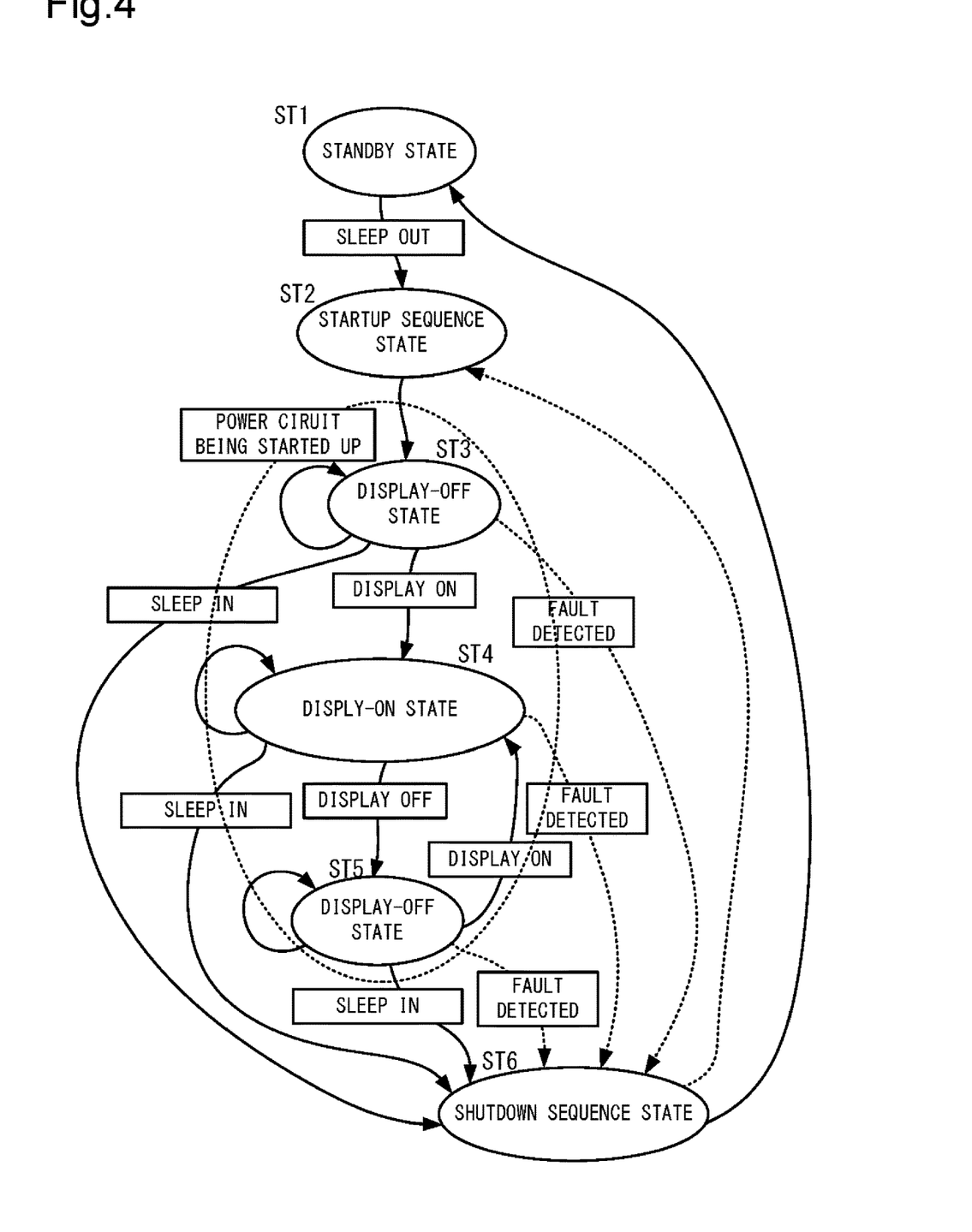
FIG. 4 is a diagram showing state transition according to one embodiment of the present invention.
Figure 5:
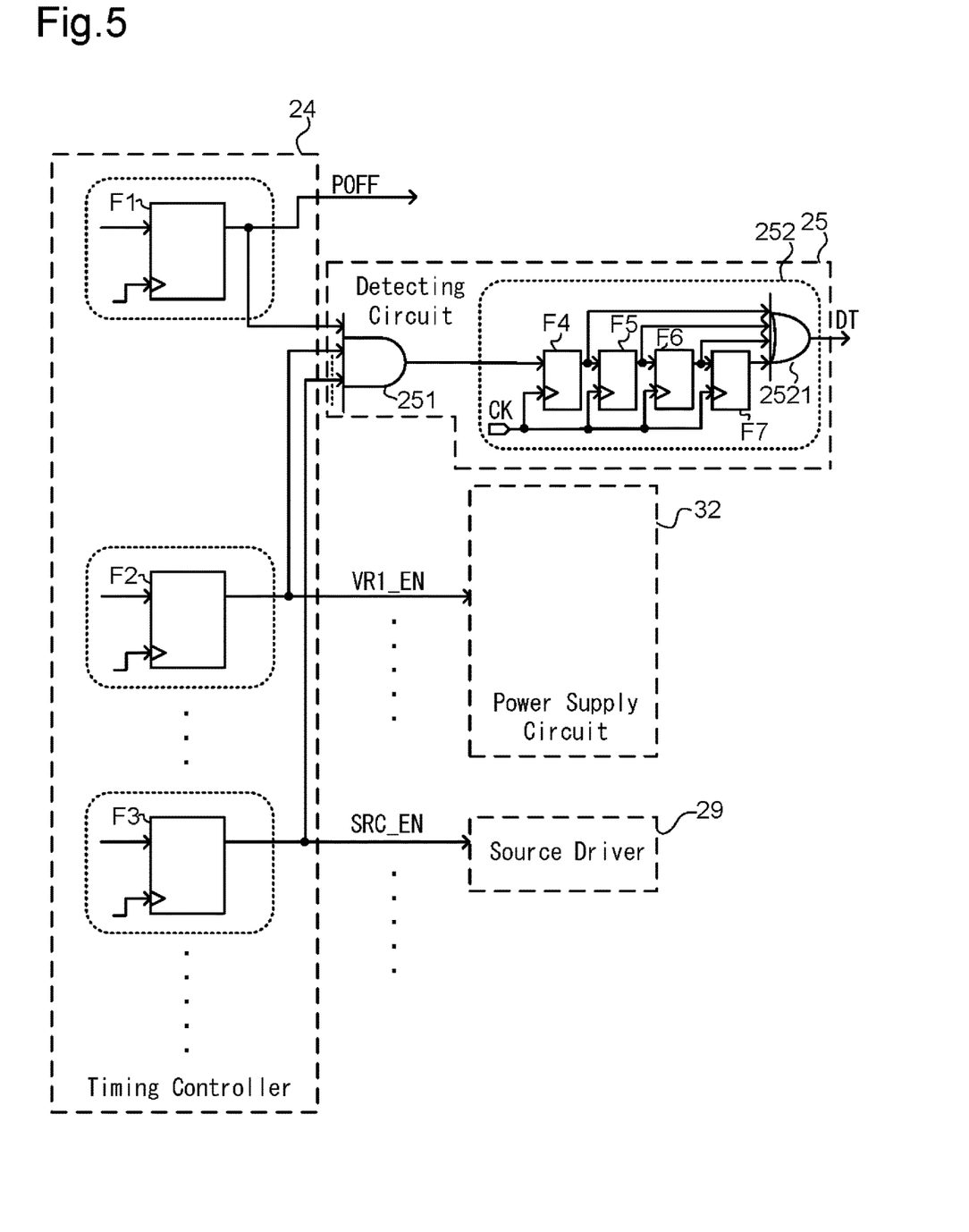
FIG. 5 is a diagram showing a configuration of a timing controller and a fault detection circuit according to one embodiment of the present invention.

Next, state transition control by the LCD driver 20 will be described with reference to FIGS. 4 to 7. FIG. 4 is a diagram showing state transition in the LCD driver 20. FIG. 5 is a diagram showing a configuration of the timing controller 24 and the fault detection circuit 25.

First, suppose that the sequencer 23 is in standby state ST1. Here, as shown in FIG. 5, the timing controller 24 includes D flip-flops F1 to F3. The flip-flop F2 feeds the first power block 321 in the power supply circuit 32 with an enable signal VR1_EN for turning on and off the power block. Likewise, unillustrated D flip-flops feed the other power blocks in the power supply circuit 32, that is, the second to eighth power blocks 322 to 328, with enable signals respectively. With the sequencer 23 in standby state ST1, the enable signals that are fed to the first to eighth power blocks are all at low level, which indicates off; thus, the first to eighth power blocks 321 to 328 are all off.

In standby state ST1, when a sleep-out command (power startup command) is transmitted from the host controller 10 and is stored in the data register 22, the sequencer 23 shifts to startup sequence state ST2. The timing controller 24 then starts a startup sequence based on an instruction from the sequencer 23.

Figure 6:
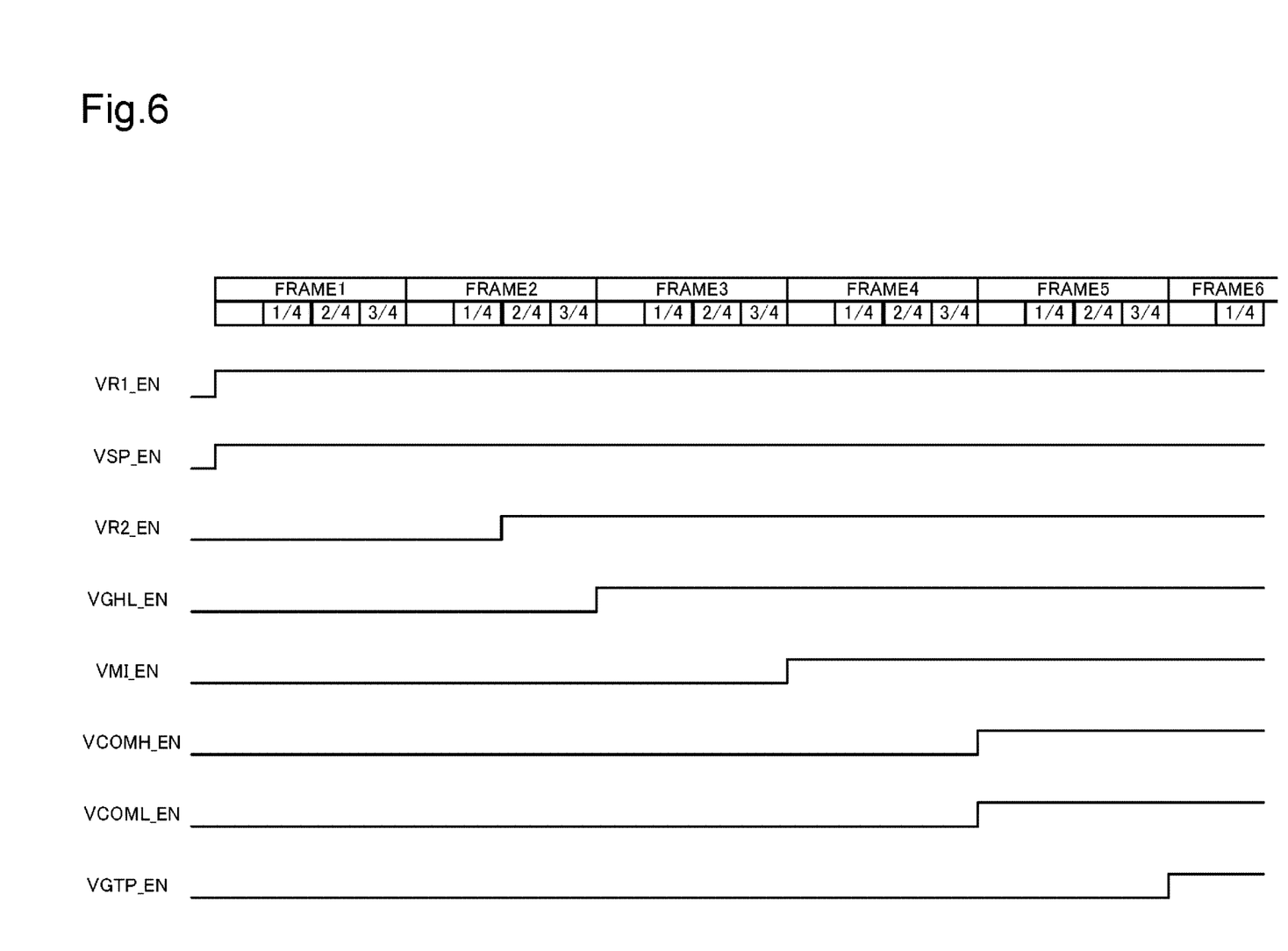
FIG. 6 is a timing chart showing an example of a startup sequence.

FIG. 6 is a timing chart showing the startup sequence performed by the timing controller 24. FIG. 6 depicts, from top down, the enable signal VR1_EN to the first power block 321, the enable signal VSP_EN to the sixth power block 326, the enable signal VR2_EN to the fifth power block 325, the enable signal VGHL_EN to the eighth power block 328, the enable signal VMI_EN to the seventh power block 327, the enable signal VCOMH_EN to the third power block 323, the enable signal VCOML_EN to the fourth power block 324, and the enable signal VGTP_EN to the second power block 322. Each of these enable signals indicates, when at high level, that the power block is on and, when at low level, that the power block is off.

Across the top of FIG. 6 are indicated periods corresponding respectively to one-fourths of the number of lines in one frame after another. In a case where one frame contains 300 lines, each of those periods corresponds to 75 lines.

The startup sequence proceeds as follows. First, when starting to count the first frame, the timing controller 24 raises the enable signals VR1_EN and VSP_EN to high level. This turns on the first and sixth power blocks 321 and 326.

Next, when having counted up to half the number of lines in the second frame, the timing controller 24 raises the enable signal VR2_EN to high level. This turns on the fifth power block 325.

Next, when having counted all the number of lines in the second frame, the timing controller 24 raises the enable signal VGHL_EN to high level. This turns on the eighth power block 328.

Next, when having counted all the number of lines in the third frame, the timing controller 24 raises the enable signal VMI_EN to high level. This turns on the seventh power block 327.

Next, when having counted all the number of lines in the fourth frame, the timing controller 24 raises the enable signals VCOMH_EN and VCOML_EN both to high level. This turns on the third and fourth power blocks 323 and 324.

Then, when having counted all the number of lines in the fifth frame, the timing controller 24 raises the enable signal VGTP_EN to high level. This turns on the second power block 322.

Through this startup sequence, the power blocks are turned on in proper order. It is thus possible to avoid malfunction.

On completion of the startup sequence, when all the above enable signals have turned to high level, the sequencer 23 shifts to display-off state ST3.

Here, as shown in FIG. 5, there are other enable signals than those to the power supply circuit 32: for example, the D flip-flop F3 outputs another enable signal SRC_EN to the source driver 29. Likewise, there are other, unillustrated, D flip-flops than F3 that output enable signals to the gate driver 30, the common voltage generator 31, and the gamma voltage generator 33 respectively. These enable signals for the display system are signals for turning on and off the respective blocks to which they are fed, keeping them on when at high level and off when at low level.

When the sequencer 23 turns to display-off state ST3, the timing controller 24 turns the enable signals for the display system to high level.

Then, under the control by the timing controller 24, the gate driver 30 and the source driver 29 drive the LCD panel 40 such that the voltages applied to all pixels equals approximately zero. This causes the LCD panel 40 to display, for example, a plain black image. Here, the LCD panel 40 may instead be simply left undriven. In either case, in display-off state ST3, the LCD panel 40 remains in a display-off state.

So long as no command is transmitted from the host controller 10, the sequencer 23 maintains display-off state ST3. When a display-on command is transmitted from the host controller 10 and is stored in the data register 22, the sequencer 23 shifts to display-on state ST4. Then, under the control of the timing controller 24, the gate driver 20 and the source driver 29 drive the LCD panel 40 so that, with the source signals S(1) to S(x) based on video data fed from the source driver 29, the LCD panel 40 displays video.

So long as no command is transmitted from the host controller 10, the sequencer 23 maintains display-on state ST4. When a display-off command is transmitted from the host controller 10 and is stored in the data register 22, the sequencer 23 shifts to display-off state ST5. In display-off state ST5, as in display-off state ST3, the LCD panel 40 remains in a display-off state.

So long as no command is transmitted from the host controller 10, the sequencer 23 maintains display-off state ST5. When a display-on command is transmitted from the host controller 10 and is stored in the data register 22, the sequencer 23 shifts to display-on state ST4.

When, in display-off state ST3, display-on state ST4, or display-off state ST5, a sleep-in command (shutdown command) is transmitted from the host controller 10 and is stored in the data register 22, the sequencer 23 shifts to shutdown sequence state ST6.

Figure 7:
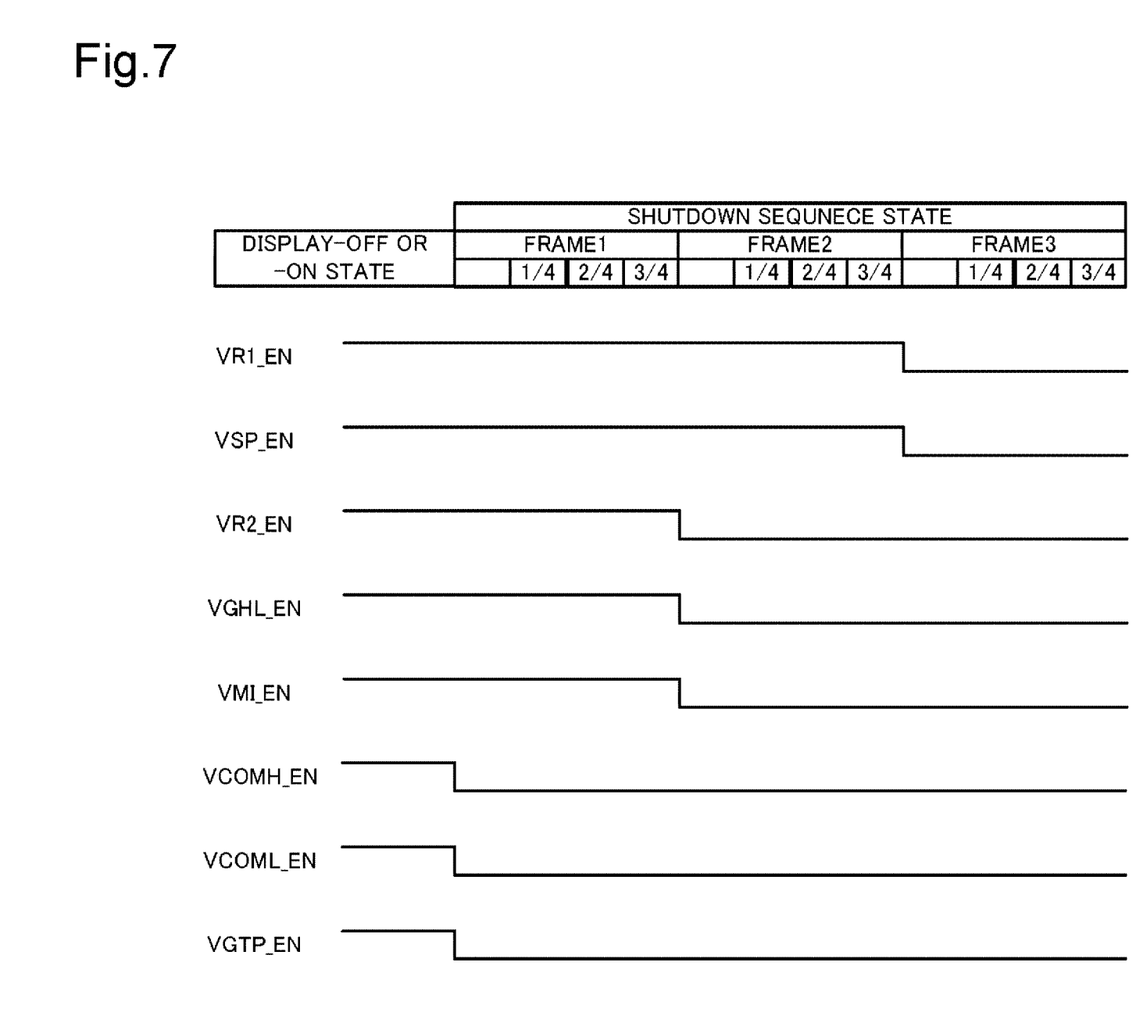
FIG. 7 is a timing chart showing an example of a shutdown sequence.

Then, based on an instruction from the sequencer 23, the timing controller 24 starts a shutdown sequence. FIG. 7 is a timing chart showing an example of the shutdown sequence. As shown in FIG. 7, the shutdown sequence proceeds as follows. First, when starting to count the first frame, the timing controller 24 drops the enable signals VCOMH_EN, VCOML_EN, and VGTP_EN to low level. This turns off the second to fourth power blocks 322 to 324.

Next, when having counted all the number of lines in the first frame, the timing controller 24 drops the enable signals VR2_EN, VGHL_EN, and VMI_EN to low level. This turns off the fifth, seventh, and eighth power blocks 325, 327, and 328.

Next, when having counted all the number of lines in the second frame, the timing controller 24 drops the enable signals VR1_EN and VSP_EN to low level. This turns off the power blocks 321 and 326.

Through this shutdown sequence, the power blocks are turned off in proper order. It is thus possible to avoid malfunction when the power supply circuit 32 is shut down.

Moreover, in the shutdown sequence, also the above-mentioned enable signals for the display system are all turned low.

On completion of the shutdown sequence, the sequencer 23 shifts to standby state ST1.

<Faulty State Detecting Operation>

Next, faulty state detecting operation in the LCD driver 20 will be described. As shown in FIG. 5, the fault detection circuit 25 includes an AND circuit 251 and a digital filter 252. The enable signals that are fed to the power supply circuit 32, and the enable signals for the display system that are fed to the source driver 29 and the like, are fed to the AND circuit 251. Also a power startup flag POFF that is output from the D flip-flop F1 in the timing controller 24 is fed to the AND circuit 251. The power startup flag POFF indicates whether the power supply circuit 32 is in a started-up state, and is transmitted to the host controller 10. The power startup flag POFF indicates, when at high level, the started-up state and, when at low level, a shut-down state.

In display-off state ST3, display-on state ST4, and display-off state ST5, in normal condition, all the enable signals to the power supply circuit 32, all the enable signals for the display system, and the power startup flag POFF are at high level. However, if, due to noise or the like, any one of the enable signals to the power supply circuit 32 falls to low level, the corresponding power block turns off, and this causes a fault in the display operation of the LCD panel 40. Likewise, if any one of the enable signals for the display system falls to low level, a fault in the display operation of the LCD panel 40 results. Also the falling of the power startup flag POFF to low level constitutes a fault.

Accordingly, in normal condition, the output of the AND circuit 251 is at high level; when at least one of the enable signals and the power startup flag POFF falls to low level, that is, when a faulty state arises, the output of the AND circuit 251 turns to low level. The output signal of the AND circuit 251 is fed to the digital filter 252.

The digital filter 252 is composed of D flip-flops F4 to F7, of which the inputs and outputs are connected together in sequence, and an OR circuit 2521. The D flip-flop F4 is fed with the output signal of the AND circuit 251. The respective output signals of the D flip-flops F4 to F7 are fed to the OR circuit 2521. The D flip-flops F4 to F7 are all fed with a clock signal CK. The output of the OR circuit 2521 is the output signal DT of the fault detection circuit 25.

The digital filter 252 is a circuit that, while the output of the AND circuit 251 remains at low level within a predetermined period, masks it and instead outputs a high level, and serves to suppress erroneous detection of a fault.

When the output signal DT of the fault detection circuit 25 turns to low level, that is, when a fault is detected, as indicated by broken lines in FIG. 4, regardless of a sleep-in command, the sequencer 23 forcibly shifts from display-off state ST3, display-on state ST4, or display-off state ST5 to shutdown sequence state ST6.

Thus, the timing controller 24 performs the shutdown sequence described above and shown in FIG. 7, so that the individual power blocks in the power supply circuit 32 as well as the source driver 29 and the like are turned off.

Then, the sequencer 23, without shifting to standby state ST1 as in normal condition, instead shifts to startup sequence state ST2 as indicated by a broken line in FIG. 4. Thus, the timing controller 24 performs the startup sequence described above and shown in FIG. 6, so that the individual power blocks in the power supply circuit 32 are turned on and the power supply circuit 32 is started up.

As described above, with this embodiment, a fault in display operation resulting from a fault in the power supply circuit 32 or the like is detected based on enable signals. It is thus possible to detect a fault quickly. In addition, on such an occasion, the power supply circuit 32 can be shut down safely through the shutdown sequence. Moreover, thereafter, the startup sequence is performed automatically, and thereby the power supply circuit 32 can be restarted safely and immediately.

The output signal DT of the fault detection circuit 25 may be transmitted not only to the sequencer 23 but also to the host controller 10 via the interface 21.

<Vehicle-Mounted Display>

Figure 8:
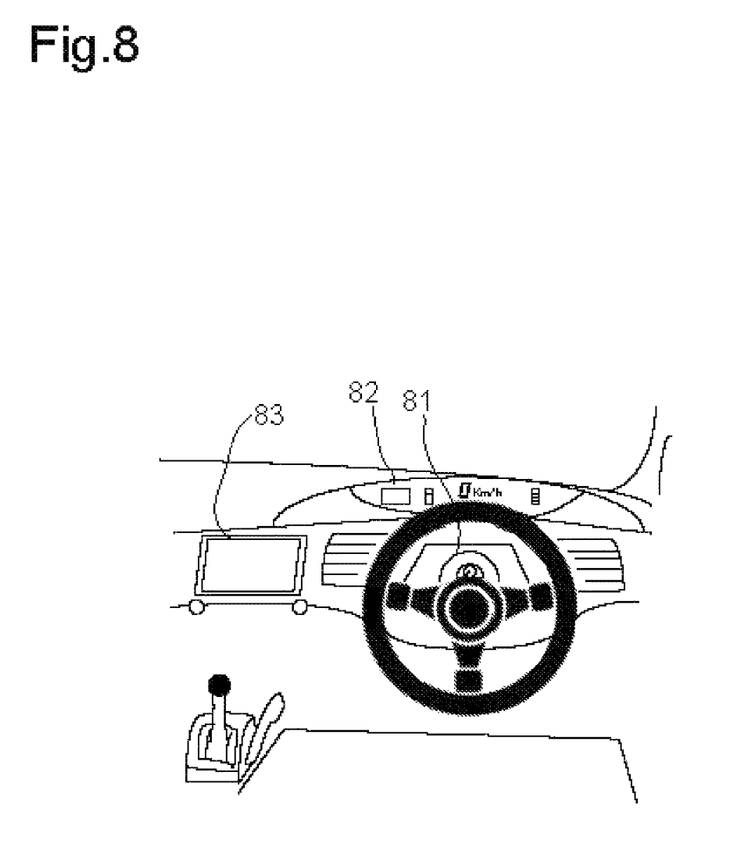
FIG. 8 is an exterior view of an example of vehicle-mounted displays.

Liquid crystal display devices according to the embodiment described above are suitable especially to vehicle-mounted displays. A vehicle-mounted display, for example like the vehicle-mounted displays 81 to 83 shown in FIG. 8, is provided on the dashboard in front of the driver's seat in a vehicle. The vehicle-mounted display 81 functions as an instrument panel that displays a speedometer, tachometer, and the like. The vehicle-mounted display 82 displays a fuel gauge, a fuel economy gauge, the shift position, and the like. The vehicle-mounted display 83 has a navigation function, by displaying information on the vehicle's current location and information on routes to destinations, and a back monitor function, by displaying a shot image rearward of the vehicle.

<Modifications>

It should be understood that the embodiments disclosed herein are in every aspect illustrative and not restrictive, and that the technical scope of the present invention is defined not by the description of embodiments given above but by the scope of the appended claims and encompasses any modification in the sense and scope equivalent to those of the claims.

Liquid crystal display devices according to the embodiment described above are not for vehicle-mounted use only; they find application also in smartphones, tablet computers, and the like.

INDUSTRIAL APPLICABILITY

The present invention is applicable suitably to, for example, vehicle-mounted display devices.

LIST OF REFERENCE SIGNS 1 liquid crystal display device
10 host controller
20 LCD driver
21 interface
22 data register
23 sequencer
24 timing controller
25 fault detection circuit
26 RAM
27 data converter
28 data latch
29 source driver
30 gate driver
31 common voltage generator
32 power supply circuit
33 gamma voltage generator
40 LCD panel
81-83 vehicle-mounted display
321 first power block
322 second power block
323 third power block
324 fourth power block
325 fifth power block
326 sixth power block 327 seventh power block
328 eighth power block
F1-F7 D flip-flop
251 AND circuit
252 digital filter
2521 OR circuit

The invention claimed is:

1. A semiconductor device, comprising:
a power circuit including a plurality of power blocks having an input-output interrelationship with each other;
a power controller outputting control signals indicating on or off to the plurality of power blocks respectively;
a fault detector that includes an AND circuit to which the control signals are input, the fault detector further including a digital filter provided in a stage succeeding the AND circuit; and
a sequencer,
wherein when, during startup of the power circuit, the fault detector detects at least one of the control signals indicating off, the sequencer shifts to a predetermined shutdown sequence state and the power controller outputs the control signals so as to turn off the power blocks in a predetermined order.

2. The semiconductor device according to claim 1, wherein after the shutdown sequence, the sequencer shifts to a startup sequence state and the power controller outputs the control signals so as to turn on the power blocks in a predetermined order.

3. The semiconductor device according to claim 1, wherein
the power controller can output a power startup flag indicating a startup state of the power circuit to a host controller, and
the power startup flag is also input to the AND circuit.

4. A semiconductor device, comprising:
a power circuit including a plurality of power blocks having an input-output interrelationship with each other;
a power controller outputting control signals indicating on or off to the plurality of power blocks respectively;
a fault detector;
a sequencer; and
a driver driving a display panel, wherein output voltages of the power blocks are fed to the driver,
wherein:
when, during startup of the power circuit, the fault detector detects at least one of the control signals indicating off, the sequencer shifts to a predetermined shutdown sequence state and the power controller outputs the control signals so as to turn off the power blocks in a predetermined order,
the sequencer, in a state where the display panel is in a display-off state, shifts to the shutdown sequence based on a sleep-in command, and
when a fault is detected by the fault detector, regardless of the sleep-in command, the sequencer forcibly shifts to the shutdown sequence.

5. The semiconductor device according to claim 4, wherein
the fault detector includes an AND circuit to which the control signals are input, and
control signals that are output to the driver are also input to the AND circuit.

6. The semiconductor device according to claim 4, wherein
the sequencer, in a display-on state where video based on video data is displayed on the display panel by the driver, shifts to the shutdown sequence based on an sleep-in command, and
when a fault is detected by the fault detector, regardless of the sleep-in command, the sequencer forcibly shifts to the shutdown sequence.

7. A display device, comprising:
the semiconductor device according to claim 4; and
a display panel driven by the semiconductor device.

* * * * *